(12) United States Patent  
Jewell

(10) Patent No.: US 6,409,338 B1  
(45) Date of Patent: Jun. 25, 2002

(54) AIR-GENERATING AUDIBLE SPECTACLES DEVICE

(76) Inventor: Frank Saleem Jewell, 713 Knollwood Dr., Hendersonville, NC (US) 28791

( * ) Notice: Subject to any disclaimer, the term of this patent is extended or adjusted under 35 U.S.C. 154(b) by 0 days.

(21) Appl. No.: 09/669,510

(22) Filed: Sep. 25, 2000

(51) Int. Cl.$^7$ .................................................. G02C 1/00
(52) U.S. Cl. .................................... 351/158; 2/171.3
(58) Field of Search .................... 351/62, 158; 2/437, 2/438, 171.3

(56) References Cited

U.S. PATENT DOCUMENTS

| 4,683,587 | A | * | 7/1987 | Silverman | 351/158 |
| RE33,286 | E | * | 8/1990 | Waters | 2/171.3 |
| 5,367,345 | A | * | 11/1994 | da Silva | 351/158 |
| 5,892,564 | A | * | 4/1999 | Rahn | 351/158 |

* cited by examiner

Primary Examiner—Huy Mai

(74) Attorney, Agent, or Firm—Michael I. Kroll

(57) ABSTRACT

A headphone and fan device is provided having a sunglasses unit for receiving electronic audio signals from a modified portable audio device and transmitting the signals to detachable earphones mounted on the sunglasses unit. The sunglasses unit is further modified to couple with an airflow unit having one or more visor-mounted electric fans positioned to discharge air upon the user's upper facial area. Such air exits the airflow unit through a vent, that is a compressible pad that is circumferentially attached to the outer edge of a visor, the pad having channels about the same circumference, through which the air exits. A typical portable audio device is modified to store and transmit electric power to the sunglasses unit in a cord that simultaneously transmits electronic audio signals. This electric power is routed through the sunglasses unit to the airflow unit and on to the fan. Alternately, the cord can deliver either or both electric power and electronic audio signals directly to the airflow unit, for powering the fan, and transmitting the signals to the earphones, the earphones being mountable on the airflow unit, as well as, the sunglasses unit. The airflow unit can strap to the user's head, and either the sunglasses unit or the airflow unit can be independently utilized.

40 Claims, 16 Drawing Sheets

AIR-GENERATING AUDIBLE SPECTACLES DEVICE

BACKGROUND OF THE INVENTION

Field of the Invention

The present invention relates generally to shaded spectacles and, more specifically, to shaded spectacles having selectively controllable air circulating and selectively controllable audio systems therein. The present invention is an air-generating audible spectacles device having selectively controllable air and audio generating means. The air-generating audible spectacles device provides a sunglasses unit, a selectively detachable airflow unit, an airflow pad, selectively detachable earphones, a modified portable audio unit, an electric power supply unit, a power supply extension cord, and a selectively attachable head strap. The sunglasses unit resembles that of conventional sunglasses.

Also, the sunglasses unit provides the means of protection for the eyes of the user of said invention from harmful ultra-violet sunrays, as well as any unwanted light rays.

The sunglasses unit is furnished with a plurality of electronic couplers which provides the sunglasses unit with the interfacing means with several of the intricate components of said air-generating audible spectacles device. The selectively detachable airflow unit is a semi-oval shaped structure having a plurality of electric fans and an airflow pad there in. The selectively detachable airflow unit provides the means of air generation and airflow for said air-generating audible spectacles device.

Also, the selectively detachable airflow unit is furnished with a plurality of electrical couplers which provides the means for the selectively detachable airflow unit to interface with several of the intricate components of said air-generating audible spectacles device. The selectively detachable airflow unit is coupled to the sunglasses unit via electrical couplers located at the zenith of the sunglasses unit and at the base of the selectively detachable airflow unit.

The airflow pad is an oval shaped cushioned structure that is housed in the selectively detachable airflow unit. The airflow pad provides the means for venting and controlling the directional airflow generated by the fans that comprises the selectively detachable airflow unit. The airflow pad includes a series of cooling vent channels that cover the entire airflow pad. The airflow pad is selectively detachable from the airflow unit providing the means for proper maintenance of the airflow pad.

The selectively detachable earphones are modified versions of conventional earphones. The selectively detachable earphones provide individual listening pleasure for the user of said air-generating audible spectacles device. The detachable earphones are furnished with pronged electrical couplers that provide interfacing means for the detachable earphones with the electrical couplers of the sunglasses unit and airflow unit.

The modified portable audio unit resembles and functions in the manner of a conventional portable audio unit. The portable audio unit has been modified in order to provide means for powering the fans in the selectively detachable airflow unit. The power supply unit is housed in the modified portable audio unit and provides means for powering the modified portable audio unit as well as the fans housed in the selectively detachable airflow unit.

The power supply extension cord provides the coupling means for the power supply and the modified portable audio to the sunglasses unit and the selectively detachable airflow unit.

The selectively attachable head strap is a thin elongated material having hooked shaped retraining clips at each of its distal ends. The selectively attachable head strap provides the means for securing said air-generating audible spectacles device to the head of the user. Also the selectively attachable head strap provides the means for retaining said invention around the neck of the user as to avoid constant removal of said invention from the person.

The air-generating audible spectacles device provides a circulating airflow around the upper facial areas of the user. Also the air-generating audible device selectively generates an audio signal for the listening comfort of the user of said device. The air-generating audible spectacles device provides the individual user with the means of eye protection from harmful sun rays as well as providing a tranquil and cool environment via the modified portable audio unit and the airflow generated from the selectively detachable airflow unit.

The air-generating audible device may be used with the sunglasses unit and the selectively detachable airflow unit coupled together as a unit or with each element as a single entity.

SUMMARY OF THE PRESENT INVENTION

The present invention overcomes the shortcomings of the prior art by providing an air-generating audible spectacles device having selectively controllable air and audio generating means.

A primary object of the present invention is to provide an air-generating audible spectacles device that may assist in the relief of persons suffering from hypothermia caused by menopause, exercise or extreme weather conditions.

Another object of the present invention is to provide an air-generating audible spectacles device that may provide cooling comforts to athletes, senior citizens and various individuals suffering from heat related discomfort.

Yet another object of the present invention is to provide an air-generating audible spectacles device that may provide protection for the eyes from hazardous and unwanted sun rays or any such light rays.

Still yet another object of the present invention is to provide an air-generating audible spectacles device that may be lightweight to promote comfort.

Yet another object of the present invention is to provide an air-generating audible spectacles device that may provide audio entertainment for the individual users of said device.

Additional objects of the present invention will appear as the description proceeds.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 1 is perspective view of the present invention. Shown is an individual enjoying the listen, cooling and eye protective comforts providing by said air-generating audible spectacles device. Also shown is the power supply extension cord as it transverses from the modified portable audio unit to the sunglasses unit of the air-generating audible spectacles device.

FIG. 2 is an exploded view, showing the mating relations between the selectively detachable earphones and the sunglasses unit via electrical couplers located on the earpieces of the sunglasses unit. Also shown is the electrical wiring transversing the frame of the sunglasses unit as well as the selectively detachable airflow unit. Shown also is the displacement relations between the intricate components which comprise said air-generating audible spectacles device. Also shown is the linear displacement relations of the electrical couplers and jacks as they relate to each other as well as the units in which they are housed. Shown also is the selectively detachable airflow unit and the sunglasses unit as two separate functioning components of said air-generating audible spectacles device.

FIG. 3 is sectional view taken from FIG. 2. Showing is a possible wiring layout for said air-generating audible device sunglasses unit as it may be seen in an assembly print. Also shown is the linear displacement of the electrical couplers and jacks that are common to the sunglasses unit. Shown also is displacement relations of a plurality of electrical node points as they relate to the wiring found in the sunglasses unit.

FIG. 4 is a top view, and partial sectional, showing the mating relations of the multi-prong plug on the power supply extension cord and an electrical jack on the sunglasses unit of said air-generating audible spectacles device. Also shown is the linear displacement of one of the earphones as it is affixed to the earpiece of the sunglasses unit.

FIG. 5 is perspective view, showing the mating relations between the sunglasses unit and the selectively detachable airflow unit. Shown also is the linear displacement relations of the earphones to each other as they are coupled into their respective positions on the sunglasses unit. Also shown is the linear displacement relations of the earphones electrical couplers as they relate to the selectively detachable airflow unit.

FIG. 6 is a front view of the modified portable audio device, with a schematic representation showing the electrical wiring relations that exist between the modified portable audio unit and the power supply unit as they relate to the selectively detachable airflow unit. Shown also is displacement relations of a plurality of electrical node points as they relate to the wiring found in the selectively detachable airflow unit. Also shown is the schematic wiring relations between the modified portable audio unit and the selectively detachable airflow unit as it may appear in a wiring assembly print.

FIG. 7 is a rear view of the airflow unit showing fan and other wiring.

FIG. 8 is front view of the modified portable audio device and a schematic representation showing the electrical wiring relations that exist between the modified portable audio unit and the power supply unit as they relate to the sunglasses unit. Shown also is displacement relations of a plurality of electrical node points as they relate to the wiring found in the sunglasses unit. Also shown is the schematic wiring relations between the modified portable audio unit and the sunglasses unit as it may appear in a wiring assembly print.

Figure 16:
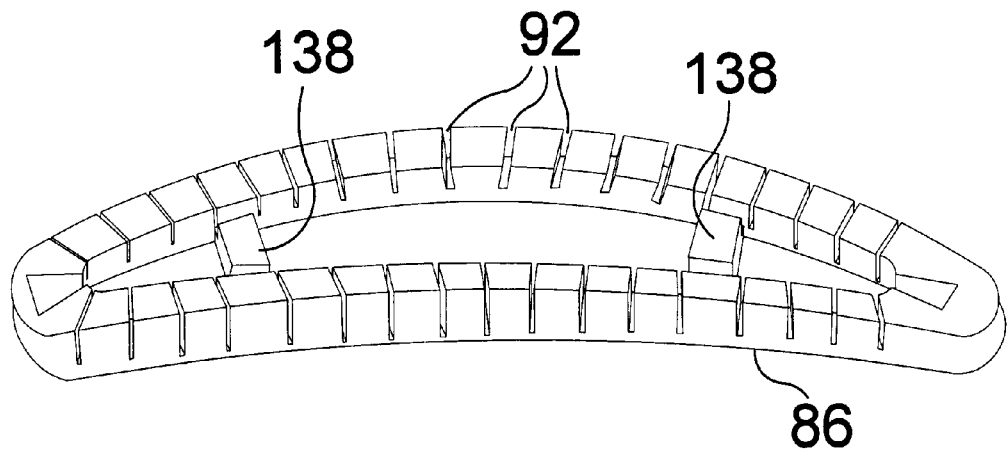

FIG. 16 is a front view of the airflow pad. Shown is the ideal shape of the airflow pad. Also shown is the plurality of cooling channel vents on the airflow pad.

Figure 17:
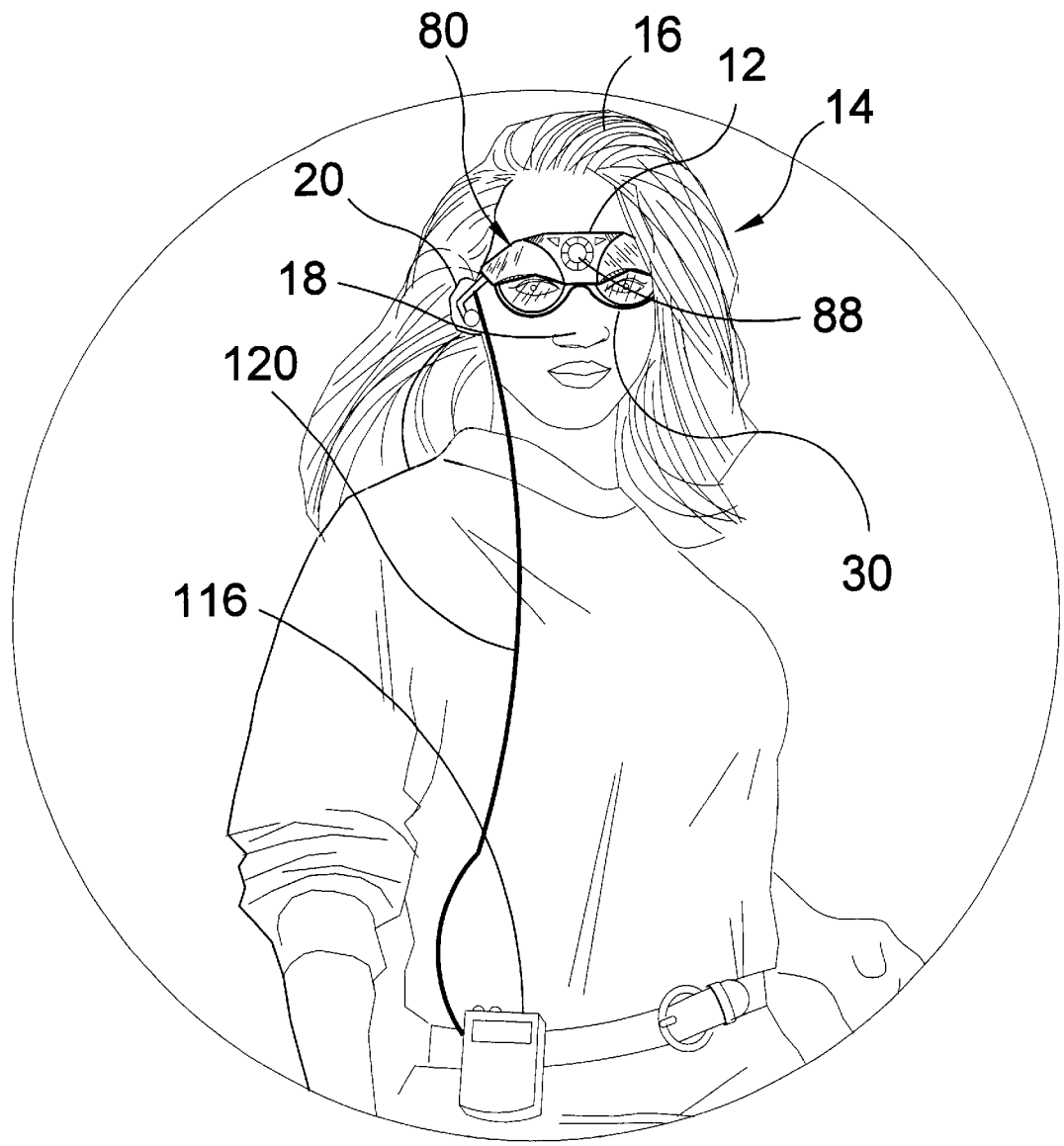

FIG. 17 is perspective view, showing an individual female enjoying the listen, cooling and eye protective comforts providing by said air-generating audible spectacles device. Also shown is the power supply extension adapter as it transverses from the modified portable audio unit to the sunglasses unit of said air-generating audible spectacles device.

DESCRIPTION OF THE REFERENCED NUMERALS

Turning now descriptively to the drawings, in which similar reference characters denote similar elements throughout the several views, the figures illustrate the Air-Generating Audible Spectacles Device of the present invention. With regard to the reference numerals used, the following numbering is used throughout the various drawing figures.

10 Air-Generating Audible Spectacles Device
12 upper face
14 user
16 head
18 nose
20 ear
30 sunglasses unit
32 lenses
34 frame
36 left earpiece
38 right earpiece
40 left hinge
42 right hinge
44 sunglasses unit audio receiving jack
46 left sunglasses unit earphone coupler
48 right sunglasses unit earphone coupler
50 left earphone
52 right earphone
54 left earphone speaker assembly
56 right earphone speaker assembly
58 left earphone extension member
60 right earphone extension member
62 left earphone extension member coupler
64 right earphone extension member coupler
66 sunglasses unit auxiliary power coupler
80 airflow unit
82 visor member 84 visor member outer edge
86 airflow pad
88 fan
90 air
92 vent channels
94 airflow unit hooks
96 head strap
98 head strap hooks
100 airflow unit power coupler
102 airflow unit left earphone coupler
104 airflow unit right earphone coupler
106 airflow unit audio receiving power jack
110 batteries
112 electric power source fixture
116 modified electronic audio device
118 electric fan controller
120 extension cord
122 multi-prong plug
124 left speaker wires in sunglasses unit
126 right speaker wires in sunglasses unit
128 electric power wire in sunglasses unit
130 left speaker wires in airflow unit
132 right speaker wires in airflow unit
134 electric power wire in airflow unit
136 additional electric fan
138 airflow pad partitions

DETAILED DESCRIPTION OF THE PREFERRED EMBODIMENT

Turning now descriptively to the drawings, in which similar reference characters denote similar elements throughout the several views, FIGS. 1–17 illustrate the Air-Generating Audible Spectacles Device of the present invention, indicated generally by the numeral 10.

Figure 1:
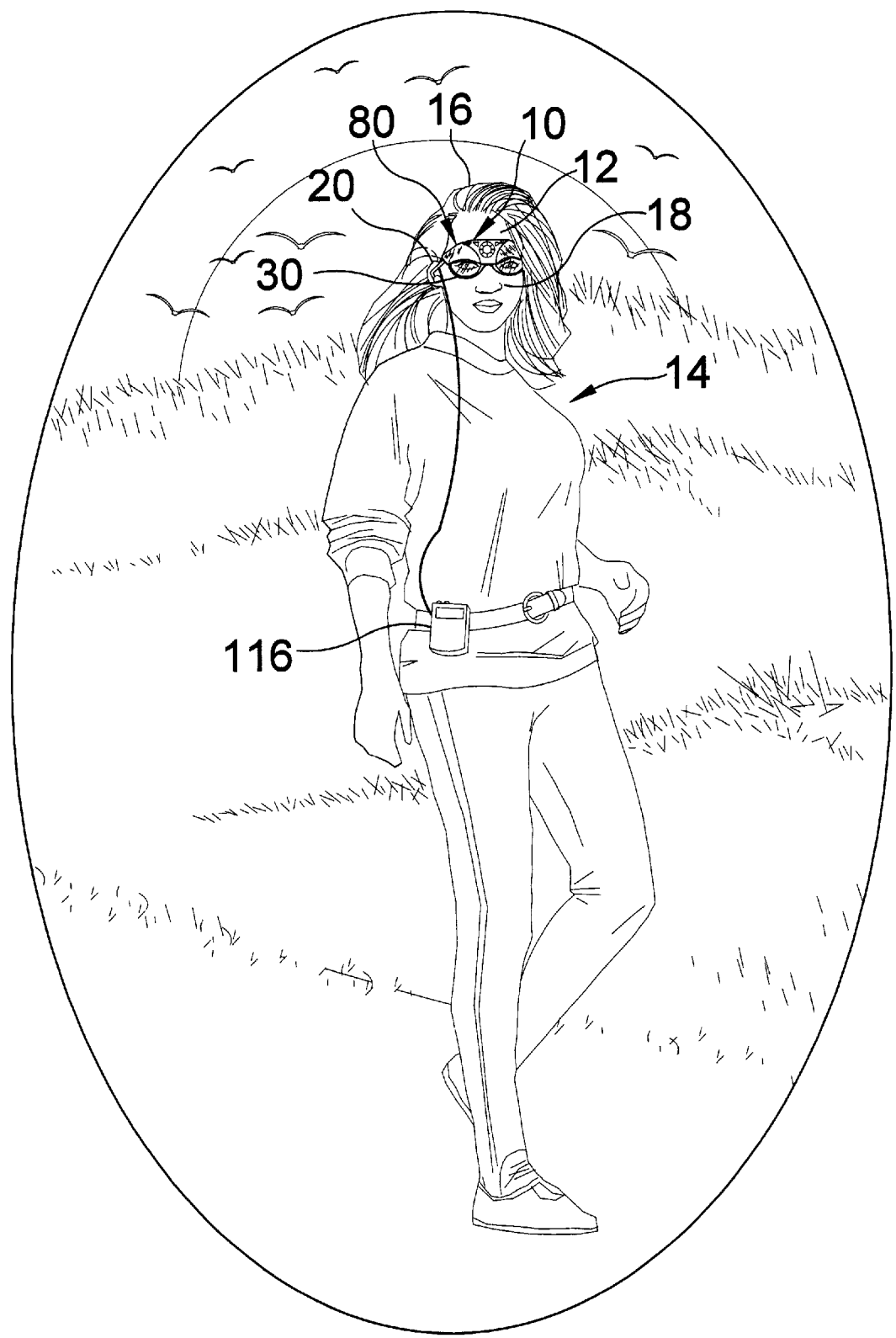

The device 10 is shown in use in FIG. 1, being worn proximate the upper face 12 of the user 14, and affixed to the head 16, while primarily resting upon the nose 18 and ears 20. As shown in FIGS. 1–17, and FIG. 2 in particular, the device 10 has a sunglasses unit 30 including lenses 32 and a frame 34 with a left earpiece 36 a right earpiece 38, a left hinge 40, and a right hinge 42, all arranged in typical fashion such that the sunglasses unit 30 rests upon the nose 18 and ears 20. FIG. 17 is a closer view of the user 14 utilizing the device 10.

Unlike most sunglasses, a sunglasses unit audio receiving jack 44 is incorporated on, or within, right earpiece 38, as shown in FIGS. 2–5 and 13. In electronic audio communication with the sunglasses unit audio receiving jack 44 is a left sunglasses unit earphone coupler 46 and a right sunglasses unit earphone coupler 48, each mounted on, or within, the left sunglasses unit earphone coupler 46, and the right sunglasses unit earphone coupler 48, respectively.

A left earphone 50 and a right earphone 52 are provided for coupling with the left sunglasses unit earphone coupler 46 and the right sunglasses unit earphone coupler 48, respectively. Each earphone 50,52 has an earphone speaker assembly 54,56 a telescoping extension member 58,60, and an extension member coupler 62,64, by which such coupling to the sunglasses unit left and right couplers 46,48. Such coupling affixes the earphones 50,52 for rotation with respect to the left earpiece 36 and the right earpiece 38, and further also mates the two such that an electronic audio signal is transmitted from the left sunglasses unit earphone coupler 46 to the left earphone 50, and from the right sunglasses unit earphone coupler 48 to the right earphone 52. This signal activates the earphone speaker assemblies 54,56, which have, by rotation and telescopic extension, been placed against the user's ears 20. The earphones 50,52 are detachable.

The sunglasses unit audio receiving jack 44 is also adapted to receive electric power. Also, a sunglasses unit auxiliary power coupler 68 is incorporated into the sunglasses unit 30. The sunglasses unit auxiliary power coupler 66 is adapted to receive both electric power and the electronic audio signal from the sunglasses unit audio receiving jack 44.

As shown in FIGS. 2,5,10–12, 15 and 16, an airflow unit 80 is provided for forcing air against the upper face 12 of the user 14. The airflow unit 80 includes a visor member 82 with an outer edge 84, to which is attached a compressible airflow pad 86. The airflow pad 86 is removable for replacement when worn. Supported within the visor member 84 is a fan 88 that draws air 90 from outside the visor member 82 and discharges the air 90 on to the upper face 12.

This combination of visor member 82 and pad 86 is generally conformable to the user's 14 upper face 12, which can include the forehead, eyebrows, eyelids, temples, hair line, and brow, depending on the chosen sizing of the visor member 82 and the particular facial features of the user 14.

As shown, in FIGS. 10, 13, 12A and 14–16, the pad 86 provides a number of generally channel-shaped vents 92, about the visor member outer edge 84. As air 90 is forced from the airflow unit 80 through such vents 92, the cooling effect is increased. For attaching the airflow unit 80 to the user's head 16, the airflow unit 80 also includes hooks 94 for the attachment of a head strap 96, using strap hooks 98, or a similar headband-shaped member. In other embodiments, other vent mechanisms can be used, such as holes, slots and the like in the visor member, all in accordance with the present invention, and as determined by the intended end use for the overall device 10, as will occur to those of skill in the art upon review of the present disclosure.

Figure 5:
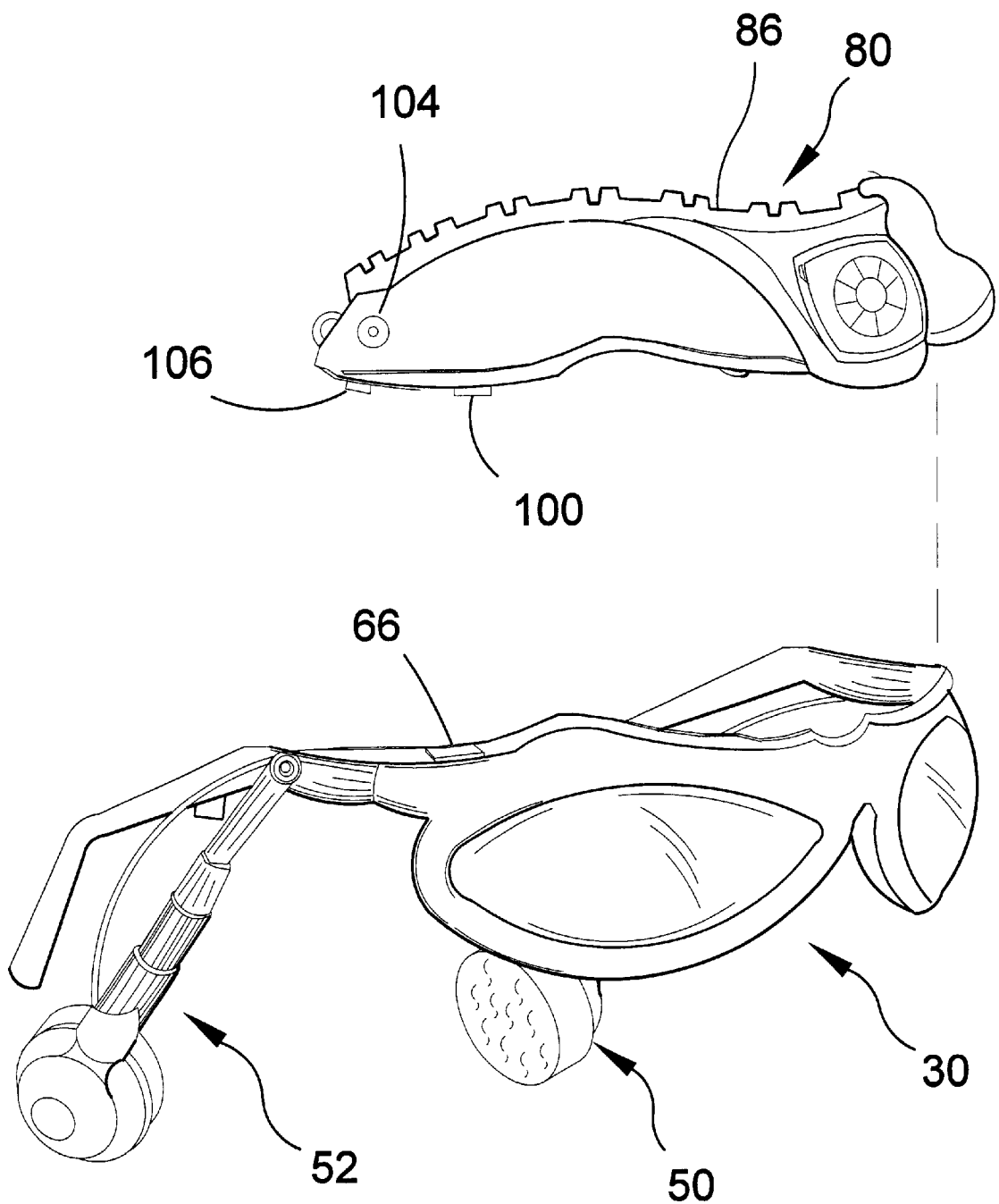
Figure 12:
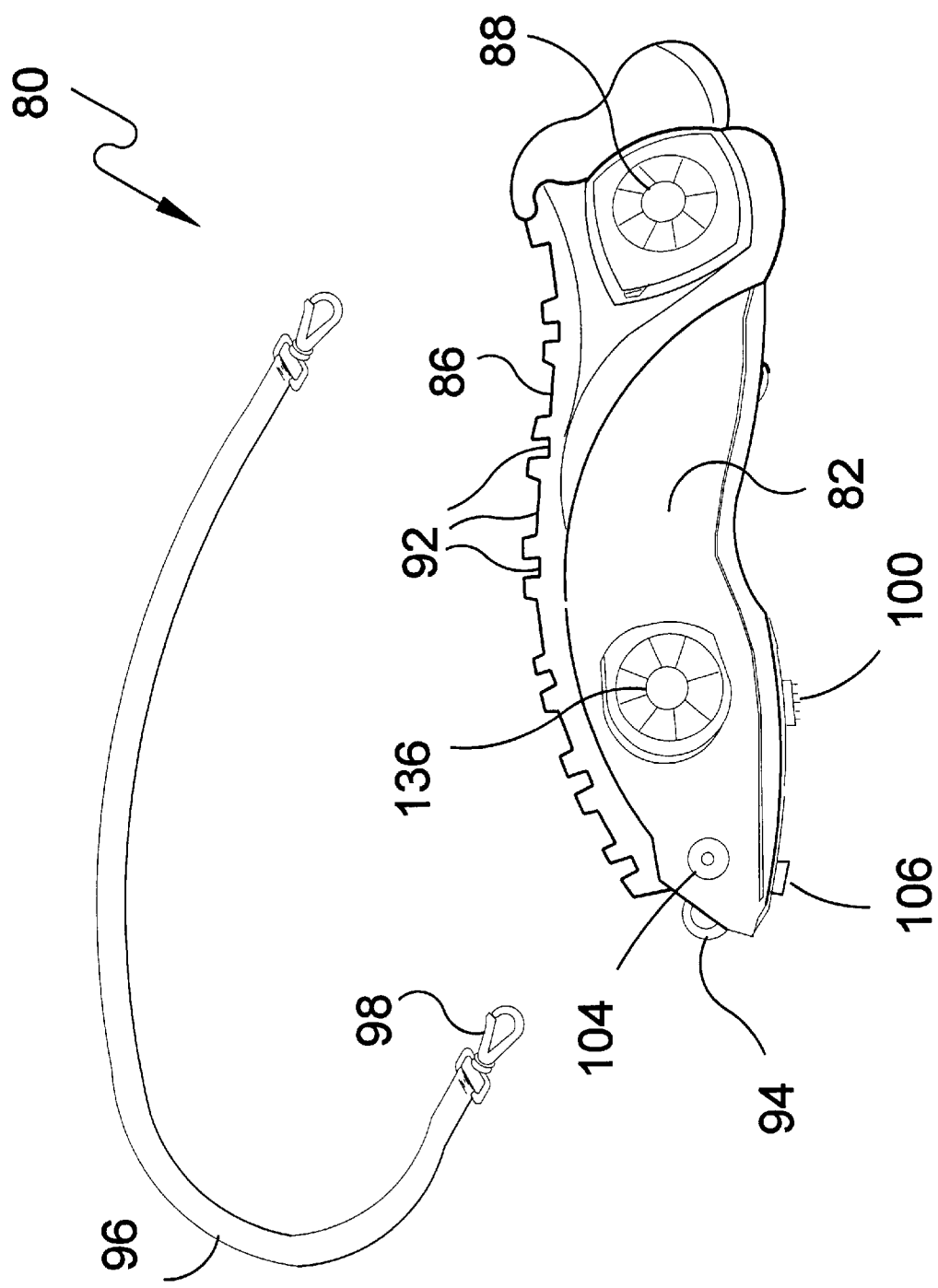
FIG. 12 is a perspective view. Shown are the displacement relations an electrical jack and coupler as they relate to the selectively detachable airflow unit.
Figure 13:
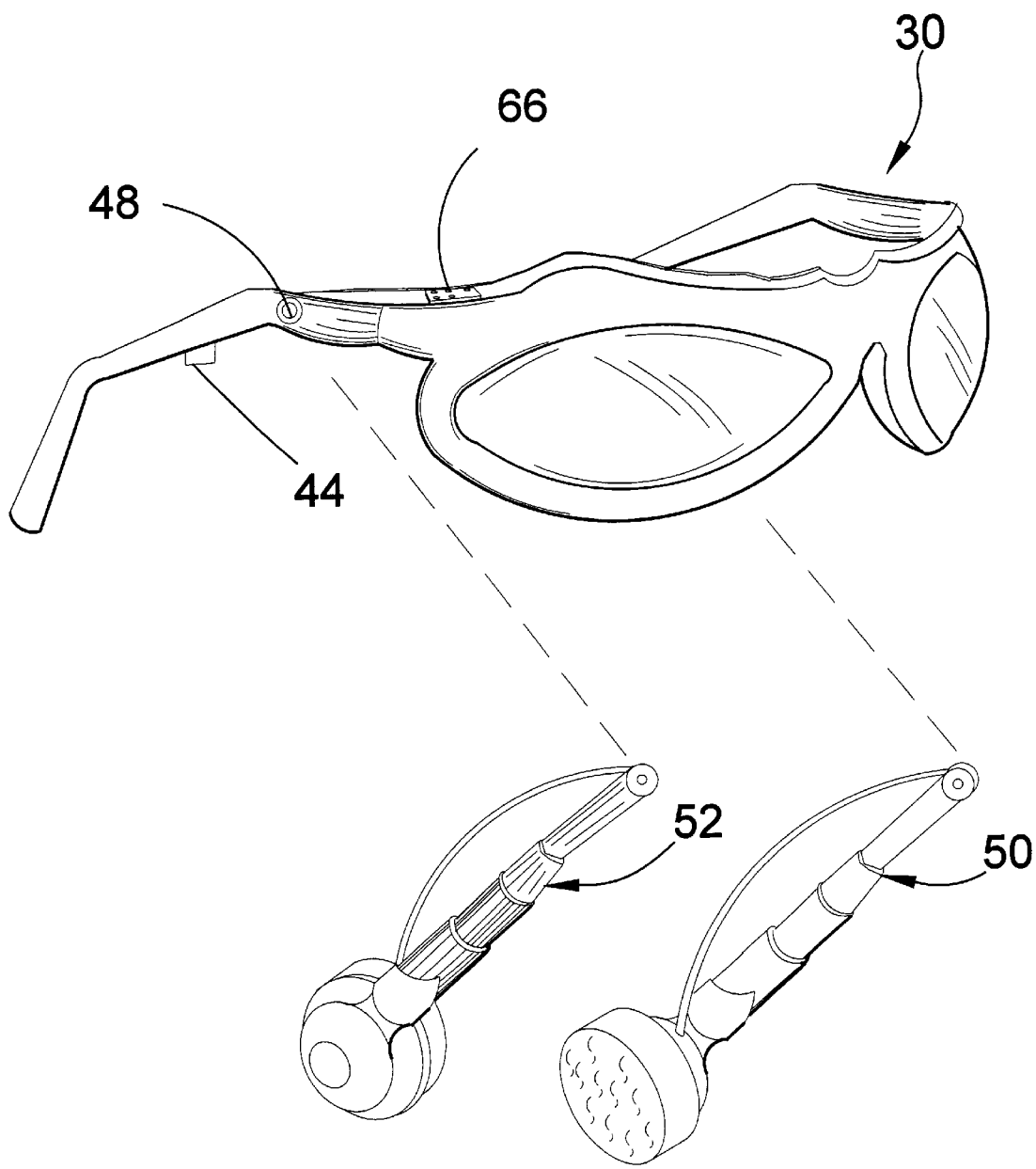
FIG. 13 is a perspective view. Shown are the displacement relations an electrical jack and coupler as they relate to the sunglasses unit.
Figure 14:
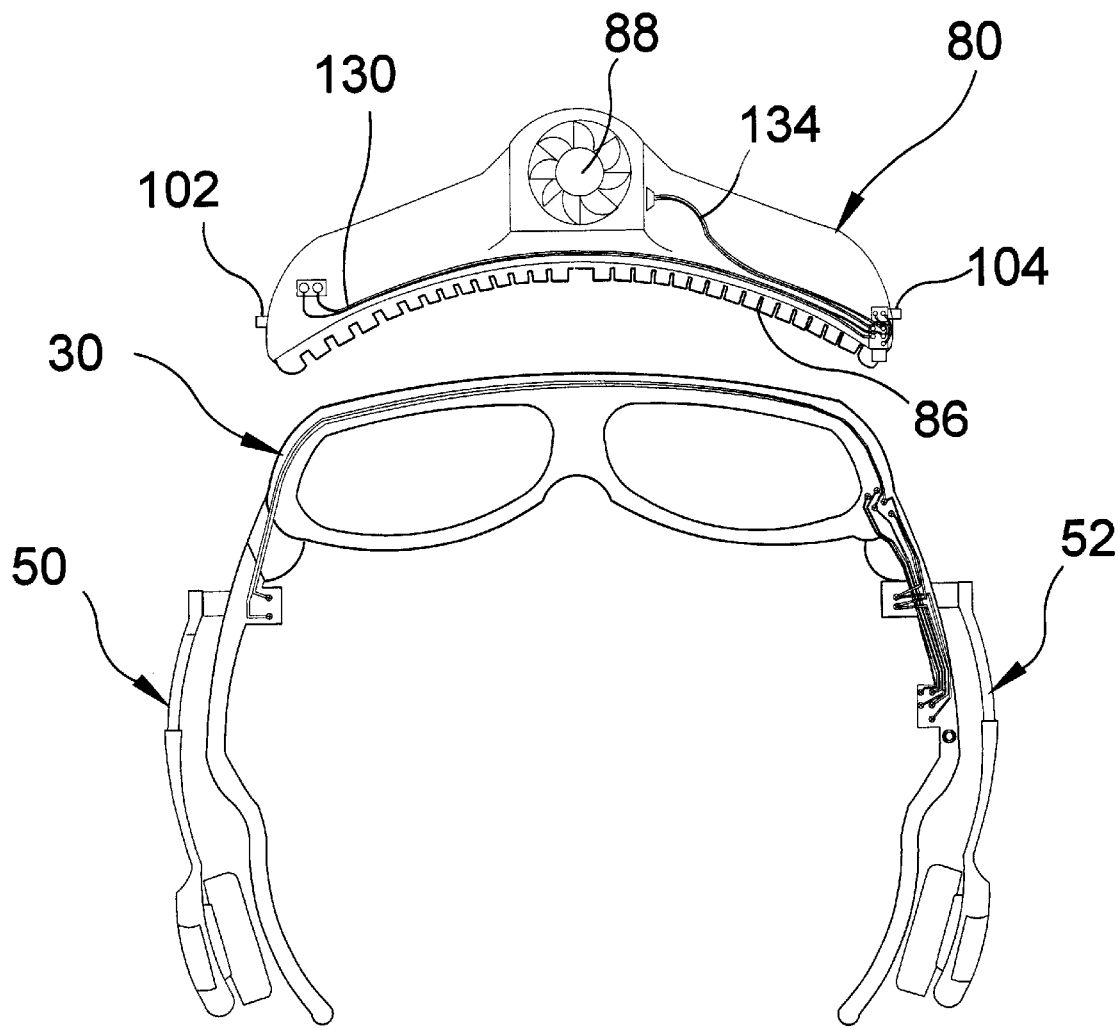
FIG. 14 is a rear perspective view of the airflow unit and sunglasses unit.
Figure 15:
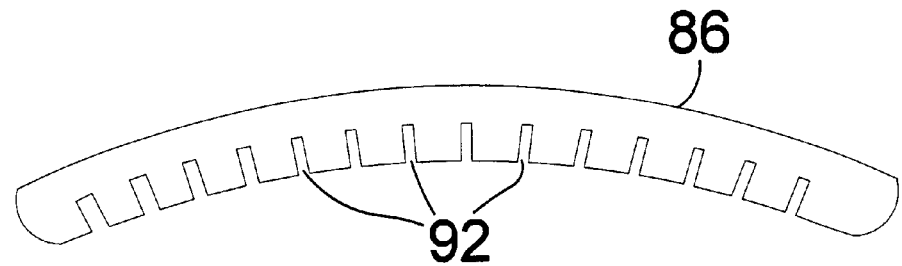
FIG. 15 is a top view of the airflow pad. Shown is the plurality of cooling channel vents on the airflow pad.

As shown in FIGS. 5 and 12, the airflow unit 80 also includes an airflow unit power coupler 100 for coupling with the sunglasses unit auxiliary power coupler 66, thus physically attaching the airflow unit 80 to the sunglasses unit 30. Such coupling also places the airflow unit power coupler 100 in electronic power communication and electronic audio communication with the sunglasses unit auxiliary power coupler 66. The airflow unit power coupler 100 is in electronic power communication with the electric fan 88.

Figure 2:
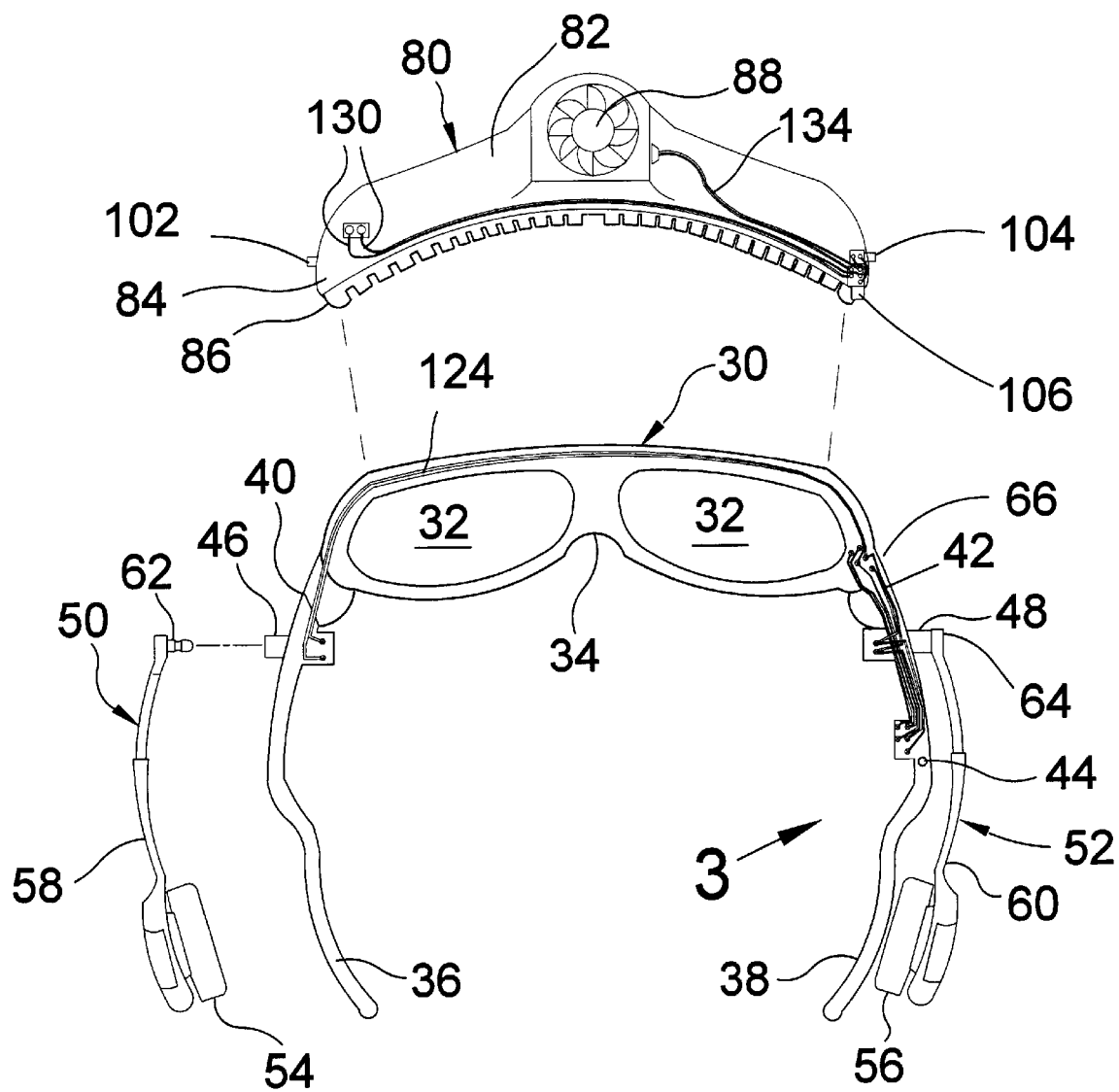
Figure 6:
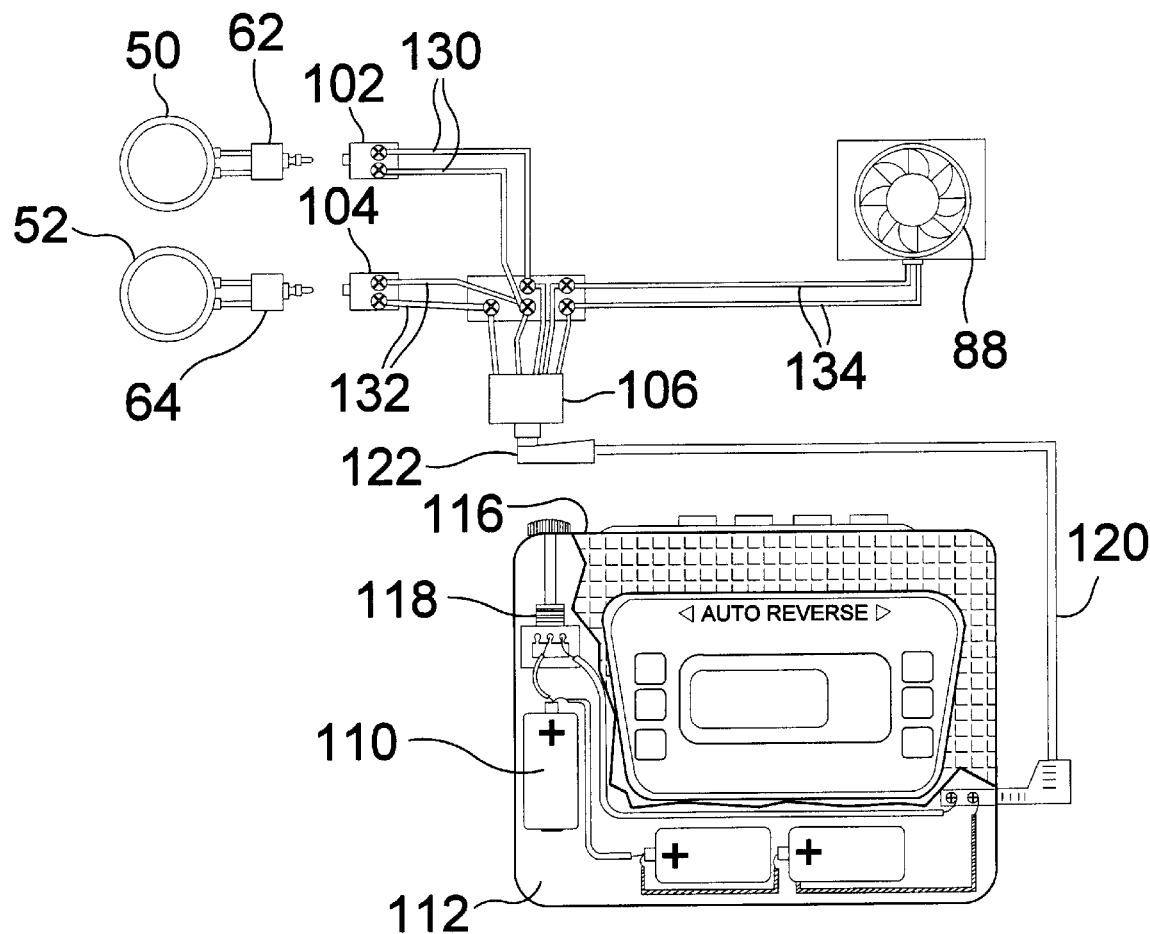
Figure 7:
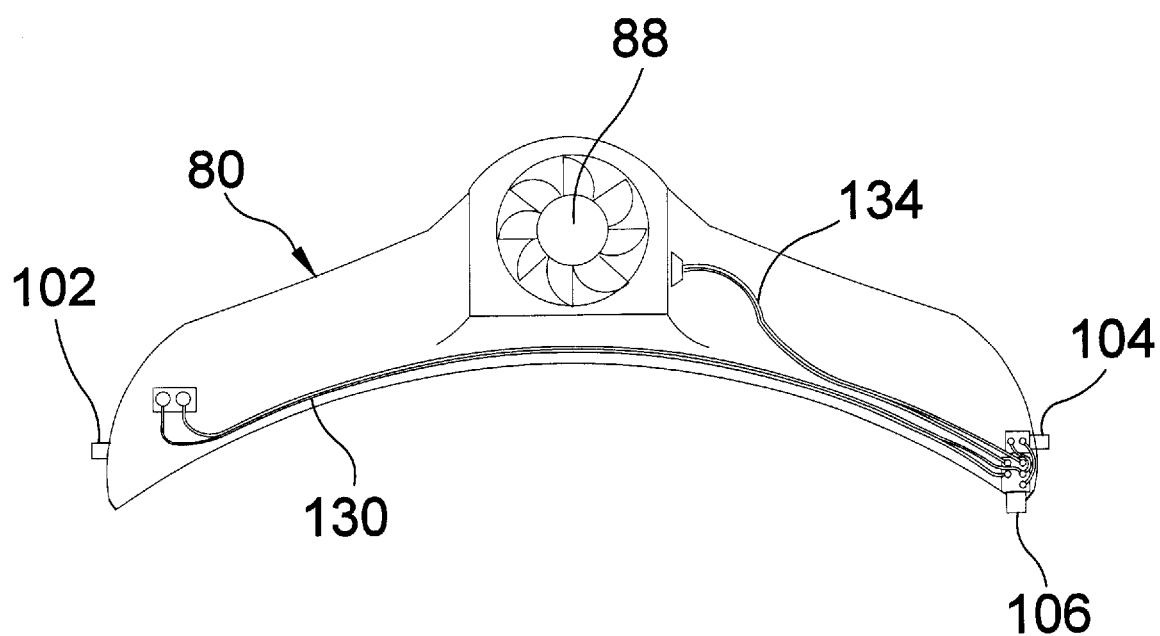

As shown in FIGS. 2, 6 and 12, the airflow unit 30 also incorporates a left earphone coupler 102 and a right earphone coupler 104, and is configured such that both the left earphone coupler 102 and the right earphone coupler 104 are in electronic audio communication with the airflow unit power coupler 100. The left earphone coupler 102 and right earphone coupler 104 are analogous in function to the left sunglasses unit earphone coupler 46 and right sunglasses unit earphone coupler 48, respectively, in that both couple with the left and right earphone extension member couplers 62,64. Similarly, the coupled left and right earphones 50,52 are in electronic audio communication with the left and right airflow unit left and right earphone couplers 102,104, respectively, and are again rotatable and extendable for positioning the earphones 50,52 proximate the user's ears 20.

As shown in FIGS. 2, 5, 6 and 12, the airflow unit 80 also incorporates an airflow unit audio receiving power jack 106 that is adapted to receive electronic audio signals and electric power. The electric fan 86 is in electronic power communication with the airflow unit audio receiving power jack 106. The airflow unit left and right earphone couplers 102,104 are in electronic audio communication with such jack 106.

Figure 8:
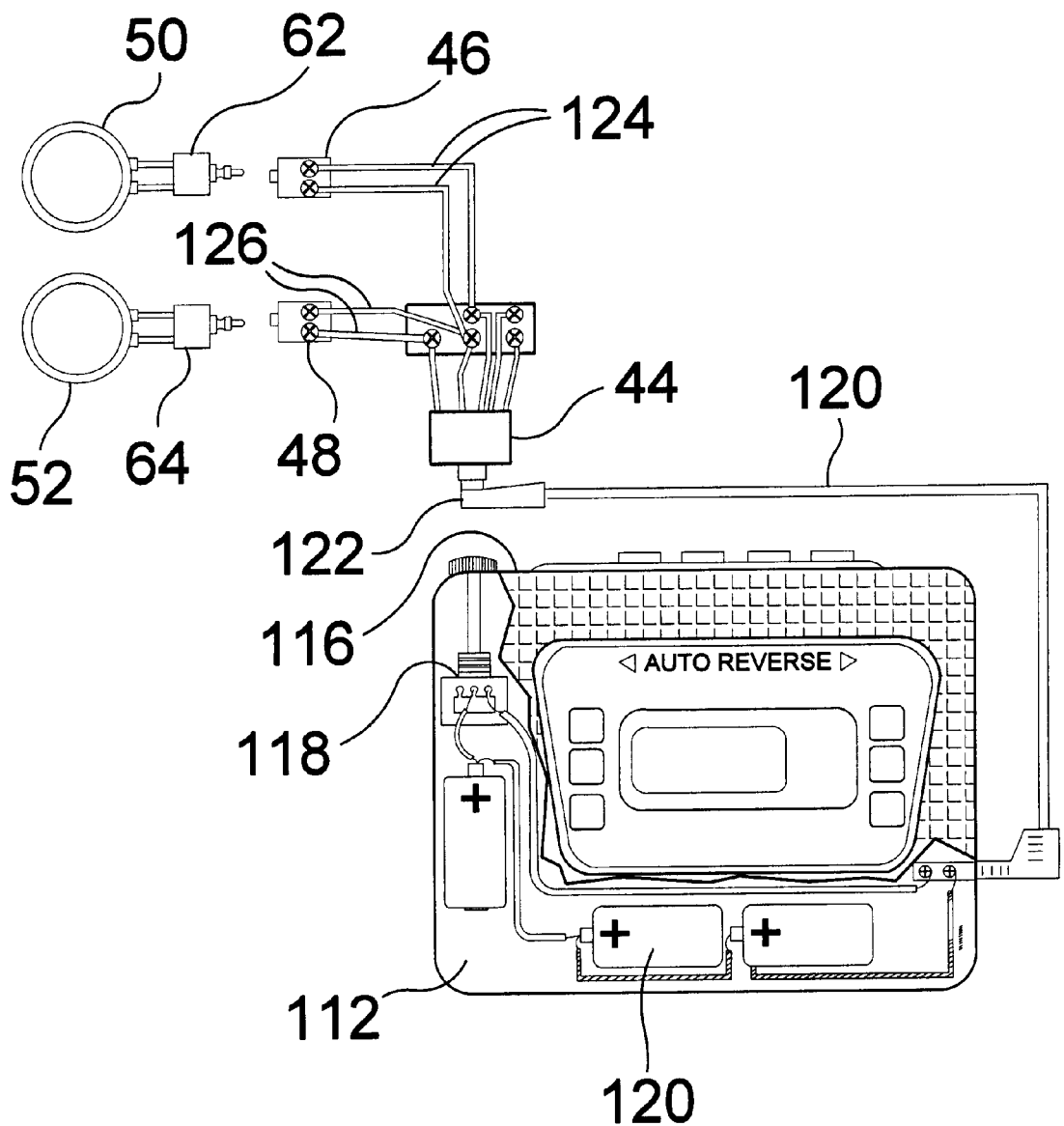
Figure 9:
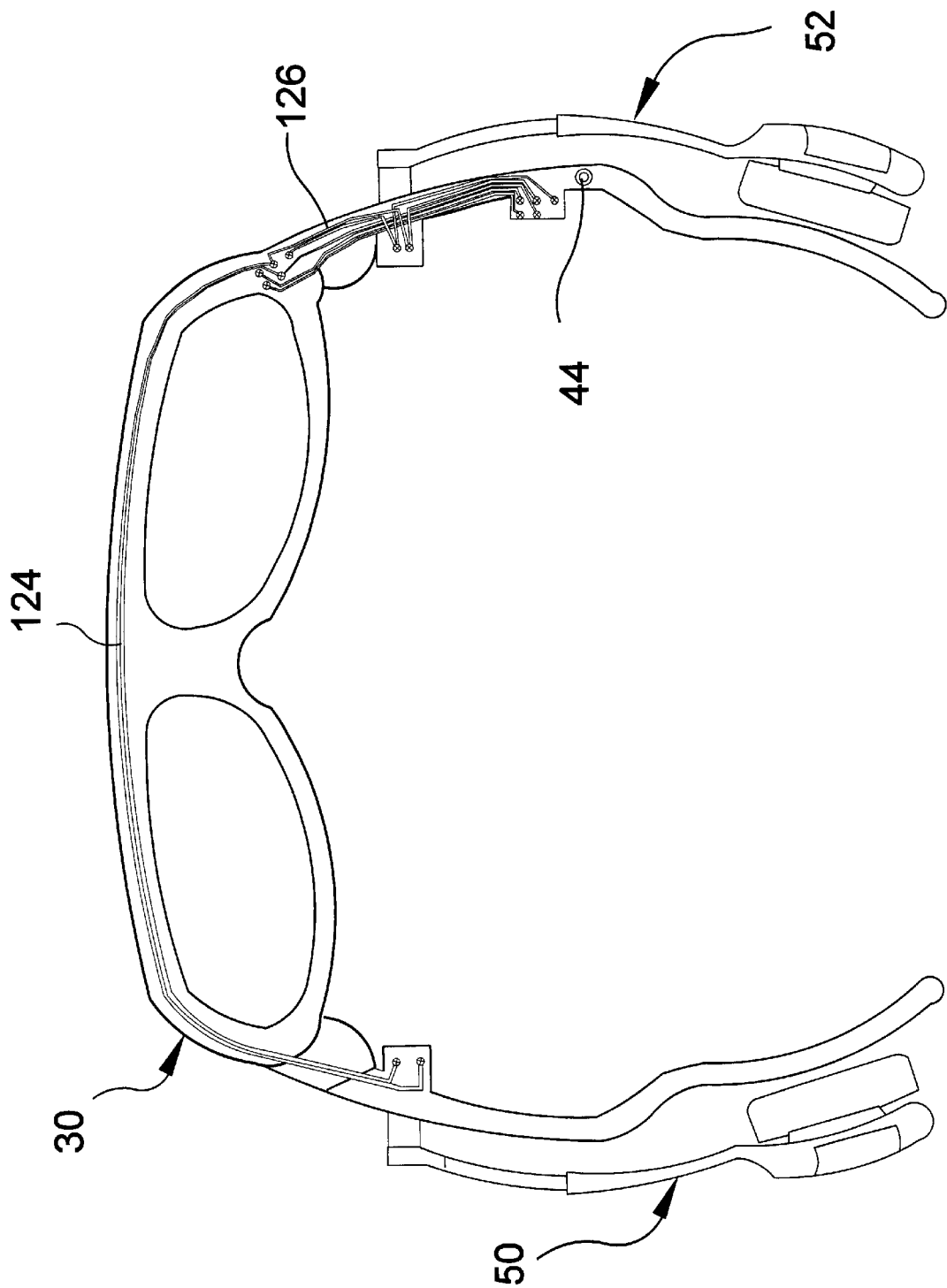
FIG. 9 is a top view of the sunglasses unit with certain wiring shown.
Figure 10:
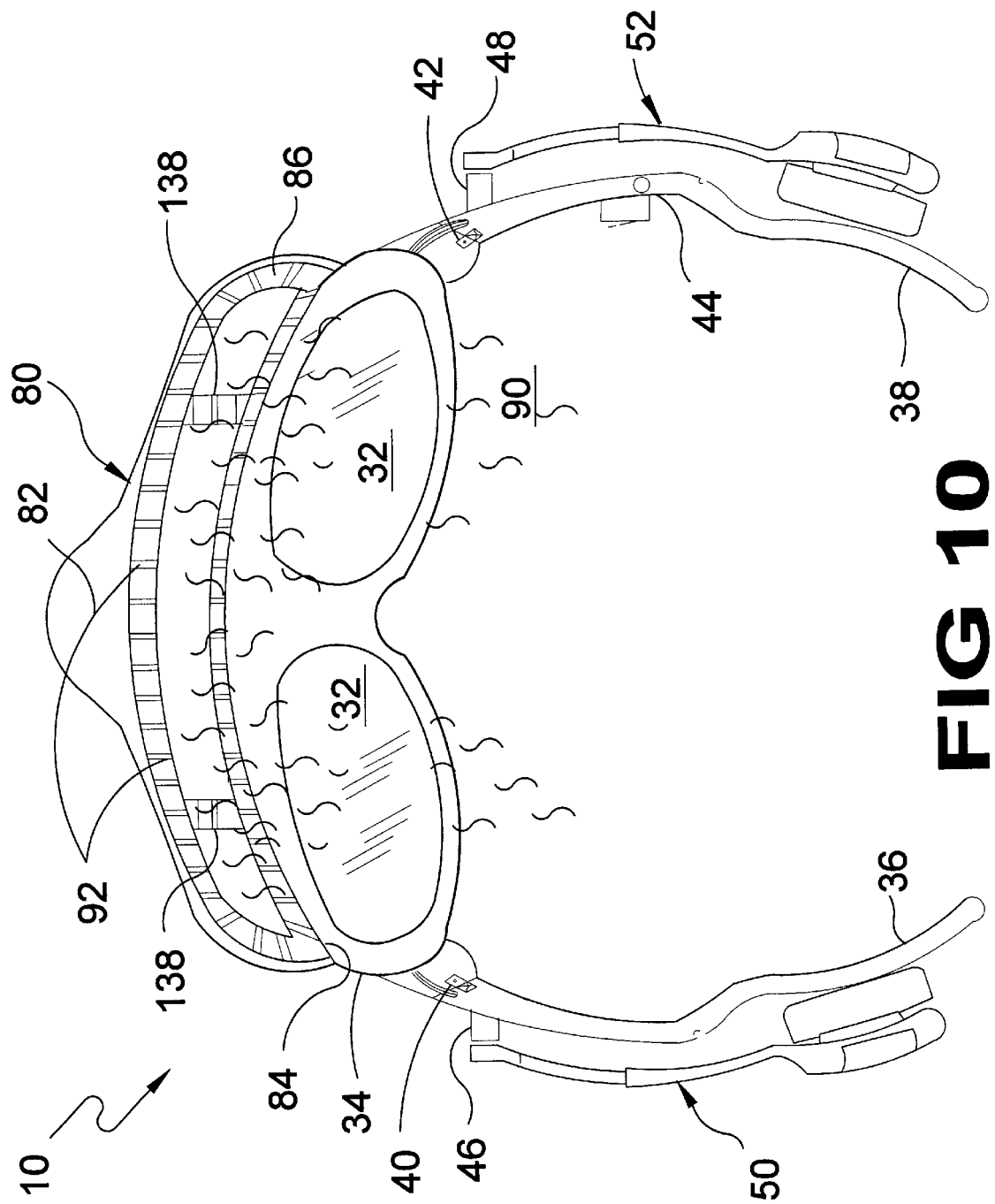
FIG. 10 is a rear view of the airflow unit, with the sunglasses earpieces rolled downward for clarity. Shown is a predicted airflow pattern that may be produced by the airflow pad when it is affixed to the sunglasses unit.
Figure 11:
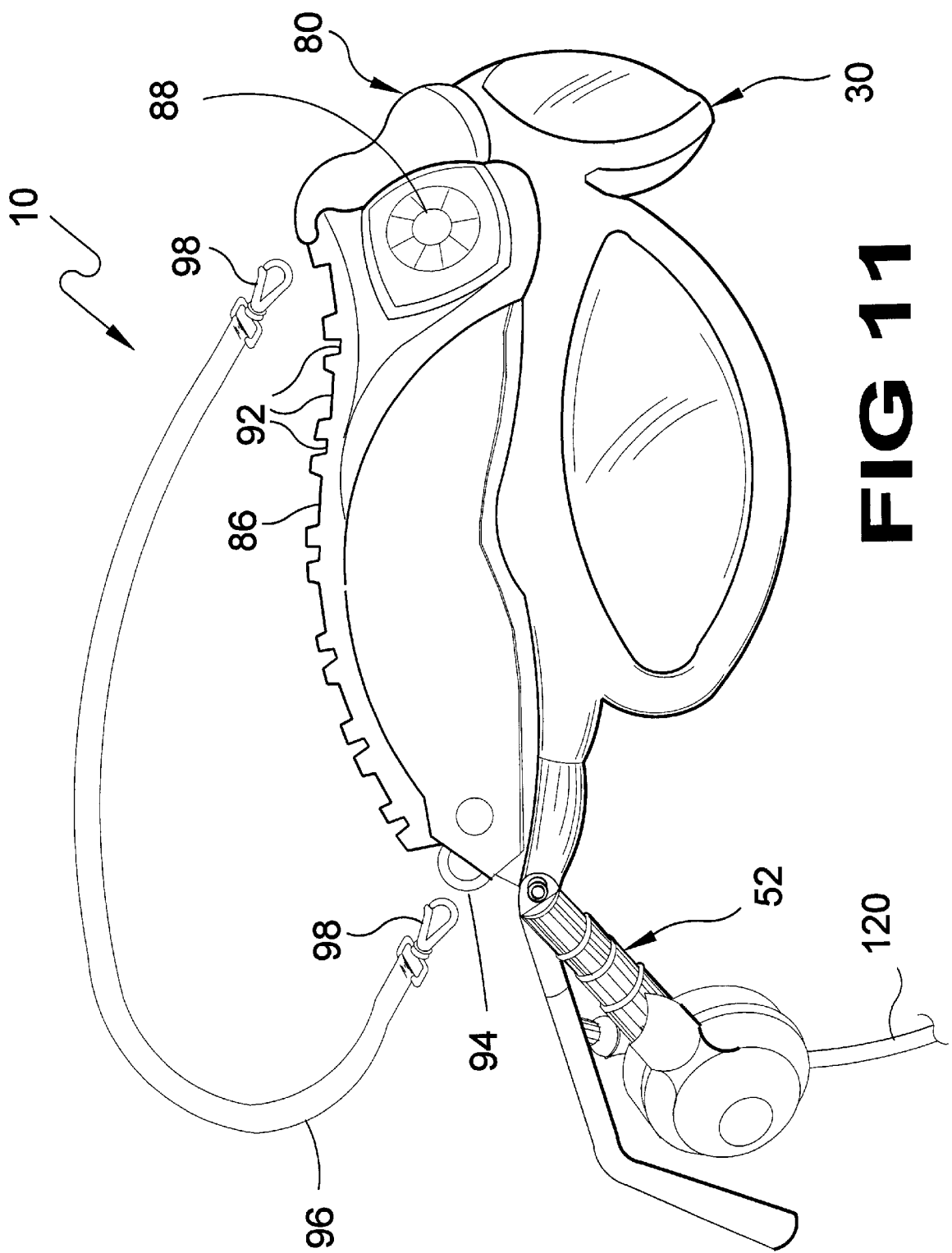
FIG. 11 is perspective view, showing the air-generating audible spectacles device as an entire functioning unit. Also shown is the connecting and retaining means provided by the selectively detachable airflow unit for the selectively attachable head strap.

The device 10 receives electric power from batteries 110, as shown in FIGS. 6 and 8. The batteries 110 are positioned in an electric power source fixture 112, which is integrated within a typical electronic audio device 116, such as a radio, cassette player, compact disc player, and the like. A fan controller 118 is provided in the battery power circuit, including typical on-off and fan speed controls. A special extension cord 120 extends from the modified electronic audio device 116. The extension cord 120 carries both the electric power for the fan 88 and the electronic audio signal for the earphones 50,52.

Figure 3:
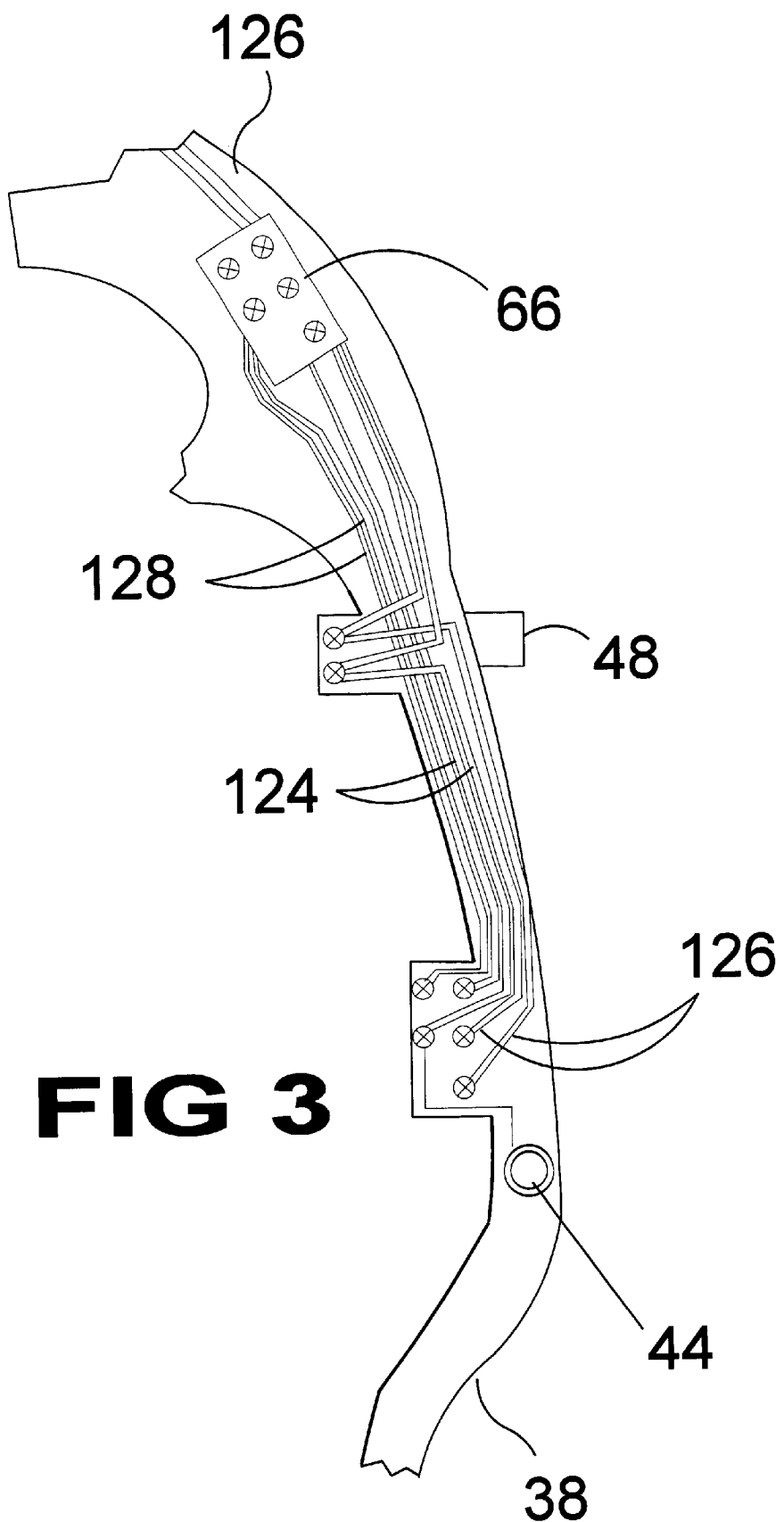
Figure 4:
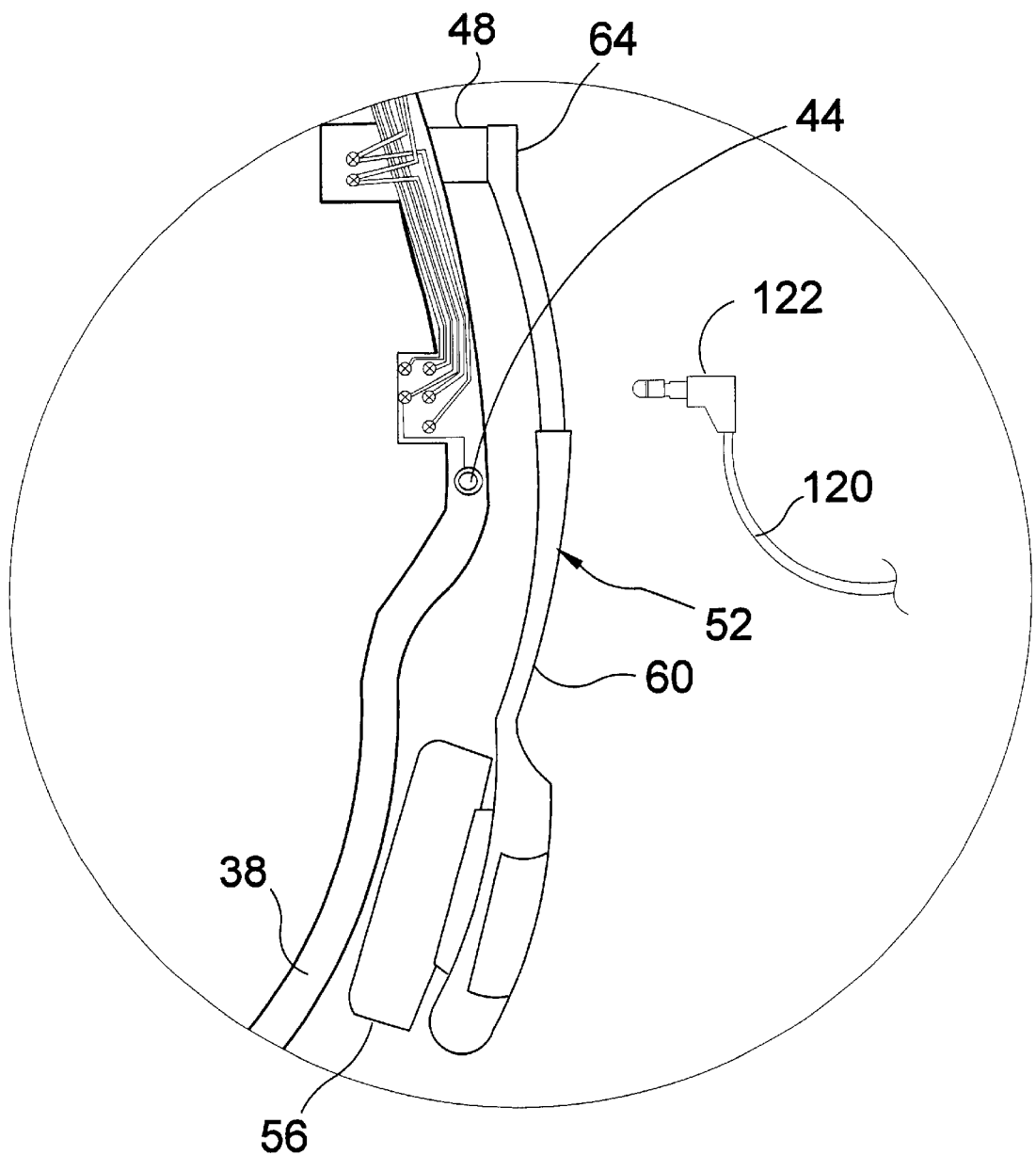

At the far end of the extension cord 120 is a multi-prong plug 122 which alternately mates with either the sunglasses unit audio receiving jack 44 or the airflow unit audio receiving power jack 106. As shown in FIG. 3 and FIG. 4, electronic audio communication is achieved by wires 124, 126 in direct connection with the sunglasses unit audio receiving jack 44, such jack 44 having been electrically mated with the multiple prongs of the multi-prong plug 122 following the insertion of such plug 122 in such jack 44. The left and right sunglasses unit earphone couplers 46,48 are directly wired to the sunglasses unit audio receiving jack by wires 124,126, respectively, as further shown in FIGS. 2–4 and 9. The sunglasses unit earphone couplers 46,48 are separately wired to allow fill stereophonic effects.

Furthermore, wires 124,126,128 deliver the electronic audio signal and electric power to the sunglasses unit auxiliary power coupler 66. As shown in FIG. 5, the airflow unit power coupler 100 mates with the sunglasses unit auxiliary power coupler 66. Wires 130,132,134 within the airflow unit 80 connect the airflow unit left and right earphone couplers 102,104 and the electric fan 88. This fully enables the airflow unit 80 for use of both the earphones 50,52 and the electric fan 88.

In the typical use of the device 10, the user 14 can choose to use the sunglasses unit 30 only, the airflow unit 80 only, or the combination of both. The user 14 will first ensure that batteries 110 are in satisfactory condition and will position the modified electronic audio device 116 in its desired position for portable use, such as about the waist.

If the user 14 has chosen to use only the sunglasses unit 30, the user 14 will attach the extension cord 120 to the modified electronic device 116 and insert the multi-prong plug in the sunglasses unit audio receiving jack 44. This insertion provides the stereophonic electronic audio signal to the sunglasses unit audio receiving jack 44 and then to the left and right sunglasses unit earphone couplers 46,48. The user 14 then attaches the left and right earphones 50,52 to the left and right sunglasses unit earphone couplers 46,48 by joining such couplers 46,48 with the left and right earphone extension member couplers 62,64. Once attached, and once the sunglasses unit 30 has been placed in the typical position on the nose 18 and ears 20, the user 14 rotates the earphones 50,52 and adjusts the length of the earphone extension members 58,60 until the earphone speaker assemblies 54,56 are in the desired position with respect to the ears 20.

If the user 14 has chosen to use only the airflow unit 80, the user 14 attaches the airflow unit 80 the head 16 by positioning the head strap 96 about the head 16 and securing the head strap 96 using the head strap hooks 98 and the airflow unit hooks 94. Although hooks 94,98 and a simple head strap 96 are used in the preferred embodiment, other elastic straps, adjustable straps, snap attachments, hook and pile attachments, and the like, can also be used, all in accordance with the present invention, and as determined by the intended end use for the overall device 10, as will occur to those of skill in the art upon review of the present disclosure.

Once the airflow unit 80 is so attached to the head 16, the visor member 82 and the airflow pad 86 can be adjusted to the most comfortable fit upon the upper face 12. Typically the airflow pad 86 will primarily abut the forehead and temple areas.

After this adjustment, the user 14 positions the modified electronic audio device 116 for portable usage, with the extension cord 120 attached, and then inserts the multi-prong plug 122 into the airflow unit audio receiving power jack 106. When the fan controller 118 is turned on, electric power is then delivered to such jack 106, where the power is then transmitted to the electric fan 88, through wire 134. Similarly, the stereophonic electronic audio signal is transmitted from the airflow unit audio receiving power jack 106 to the airflow unit earphone couplers 102,104.

At this point, the user 14 then attaches the left and right earphones 50,52 to the left and right airflow unit earphone couplers 102,104 by joining such couplers 102,104 with the left and right earphone extension member couplers 62,64. Once attached, the user 14 rotates the earphones 50,52 and adjusts the length of the earphone extension members 58,60 until the earphone speaker assemblies 54,56 are in the desired position with respect to the ears 20.

In the optimum usage of the device 10, the user 14 chooses both the sunglasses unit 30 and the airflow unit 80. In this instance, the two are joined by mating the sunglasses unit auxiliary power coupler 66 with the airflow unit power coupler 100, prior to affixing the head strap 96, and prior to donning the sunglasses unit 30. Depending upon the user's preference, the multi-prong plug 122 can then be inserted into either the sunglasses unit audio receiving jack 44 or the airflow unit audio receiving power jack 66.

If the sunglasses unit audio receiving jack 44 is chosen, the electronic audio signal is transmitted through such jack 44 to the sunglasses unit earphone couplers 46,48, directly, and to the airflow unit earphone couplers 102,104, indirectly, through the sunglasses unit auxiliary power coupler 66. Both pairs of earphone couplers 46,48,102,104 are enabled and ready for connection to the earphones 50,52 when the user 14 chooses to insert the multi-prong plug 122 in the sunglasses unit audio receiving jack. This choice also powers the electric fan 88, indirectly, through the airflow unit power coupler 66.

If the user 14 chooses to insert the multi-prong plug 122 into the airflow unit audio receiving power jack 106, such jack 106 is enabled for transmitting the electronic audio signal to the airflow unit earphone couplers 102,104, directly, and the electric power to the fan 88, directly. When this mode is chosen the airflow unit earphone couplers 102,104 are enabled and ready for attachment to the earphones 50,52, as described above. Sunglasses unit earphone couplers 46,48 are not enabled in this mode.

When so utilized the airflow unit 80 is enabled to provide the enhanced cooling effect of the fan 88 as the air 90 is forced from the airflow pad vent channels 92, with the air 90 being distributed upon and across a significant portion of the upper face 12. The visor member 82 provides additional shade for significant areas of the upper face 12, and the user 14 is able to have stereophonic sound positioned at the point of highest comfort based on the personal preferences of the user 14.

In another embodiment, additional fans are included as part of the airflow unit 80, such as the fan 136 shown in FIG. 12. Whether one or a plurality of fans 88,136 are utilized, airflow pad partitions 138 can be included to isolate fan air 90 discharge, or focus the air 90 discharge from a single fan 88 on a restricted area. The arrangement shown in FIG. 12, includes three fans 88,136, although the number of fans can vary, as well as, the size of the fans, all in accordance with the present invention, and as determined by the intended end use for the overall device 10, as will occur to those of skill in the art upon review of the present disclosure.

In another embodiment, the airflow unit 80 is provided as a separate device without the sunglasses unit 30. In this embodiment, the airflow unit power coupler 100 is omitted and the airflow unit audio receiving power jack 106 is the sole source of the electronic audio signal and electric power, following insertion of the multi-prong plug 122.

In yet another embodiment, the sunglasses unit 30 is provided as a separate device without the airflow unit 80. In this embodiment, the sunglasses unit auxiliary power coupler 66 is omitted and no electric power is routed through the extension cord 120. Similarly, no electric power modifications are made to the electronic audio device 116.

In the preferred embodiment, the sunglasses unit 30, the visor member 82, and the earphones 50,52 are constructed from typical plastics of sufficient strength to support the structure during use, although the same could be constructed from various metals, such as aluminum, or stainless steel, all in accordance with the present invention, and as determined by the intended end use for the overall device 10, as will occur to those of skill in the art upon review of the present disclosure.

It will be understood that each of the elements described above, or two or more together may also find a useful application in other applications differing from that described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headphone device for use in listening to sound generated by an electronic audio device, comprising:
    a left earphone and a right earphone, each earphone having a speaker assembly, each earphone further having an extension member attached to the speaker assembly, each extension member having a coupler;
    a sunglasses unit, the sunglasses unit having:
        a sunglasses frame, having left and right lenses;
        a sunglasses unit audio receiving jack for receiving electronic audio signals from the electronic audio device, said audio receiving jack adapted to receive electric power;
        a left sunglasses unit earphone coupler and a right sunglasses unit earphone coupler, each sunglasses unit earphone coupler being in electronic audio communication with the audio receiving jack, each sunglasses unit earphone coupler being adapted for coupling with one of the left and right earphone extension member couplers, such that each earphone extension member coupler is in electronic audio communication with such sunglasses unit earphone coupler; and
        an auxiliary power coupler to provide power take off mounted on said sunglasses frame connected to receive electric power from said audio receiving jack.

2. The device of claim 1, wherein the sunglasses frame further comprises a hinged left earpiece and a hinged right earpiece, the left sunglasses unit earphone coupler and right sunglasses unit earphone coupler being positioned on the left earpiece and the right earpiece, respectively.

3. The device of claim 1, wherein the sunglasses frame further comprises a hinged left earpiece and a hinged right earpiece, the left sunglasses unit earphone coupler and right sunglasses unit earphone coupler being integrated with the left earpiece and the right earpiece, respectively.

4. The device of claim 1, wherein the sunglasses frame further comprises a hinged left earpiece and a hinged right earpiece, the sunglasses unit audio receiving jack being positioned on one of such earpieces.

5. The device of claim 1, wherein the sunglasses frame further comprises a hinged left earpiece and a hinged right earpiece, the sunglasses unit audio receiving jack being integrated with one of such earpieces.

6. The headphone device of claim 1, wherein:
    the headphone device further comprises an airflow unit mounted on said sunglasses frame for delivering forced air to a user's upper face, the airflow unit having:
        an airflow unit power coupler for coupling the airflow unit to the sunglasses unit auxiliary power coupler, such that the airflow unit power coupler is in electronic power communication with the audio receiver jack for receiving electric power;
        an electric fan in electronic power communication with the airflow unit power coupler;
        a visor member, the visor member being generally conformable to a user's upper face, the visor being adapted to hold and position the fan such that air is drawn into the visor and blown against a user's upper face;
        a vent for discharging such air from within the visor member; and
        an attachment device for affixing the visor member against an upper face of a user.

7. The device of claim 6, wherein the number of fans is two or more, the fans being supported by the visor member, the fans being in electronic power communication.

8. The device of claim 6, wherein the vent further comprises a pad member, the pad member being attached to the visor member such that the pad member is against a user's upper face, the pad member having at least one air passageway adjacent a user's upper face, such that forced air from the fan exits the visor member.

9. The device of claim 8, wherein the visor member further comprises an outer edge, the pad member being attached to such visor member outer edge.

10. The device of claim 8, wherein the number of fans is two or more, the fans being supported by the visor member, the fans being in electronic power communication, and further wherein the pad member further comprises one or more partitions, such that substantially all of each fan's air discharge is vented prior to commingling with the air discharge of other fans.

11. The device of claim 8, wherein the pad member is compressible.

12. The device of claim 8, wherein the number of pad member air passageways is two or more.

13. The device of claim 8, wherein the pad member air passageways are channel-shaped.

14. The device of claim 6, having a head attachment device which comprises a strap attached to the visor member.

15. The device of claim 14, wherein the strap is resilient.

16. The device of claim 14, wherein the strap is elastic.

17. The device of claim 14, wherein the strap is adjustable.

18. The device of claim 6, further comprising:
   an electric power source fixture adapted to receive and transmit electric power from batteries, the electric power source fixture being integrated with the electronic audio device; and
   a cord for transmitting electric power from the electric power source fixture to the airflow unit audio receiving power jack.

19. The device of claim 18, further comprising a fan controller, the fan controller being integrated with the electronic audio device.

20. The device of claim 18, further comprising one or more batteries for powering the electric power source fixture.

21. A headphone device for use in listening to sound generated by an electronic audio device, comprising:
   a left earphone and a right earphone;
   a sunglasses unit, the sunglasses unit having:
      means for adjustably attaching the earphones to the sunglasses unit;
      means for receiving electronic audio signals from the electronic audio device to the sunglasses unit;
      means for communicating the electronic audio signals from the sunglasses unit to the earphones;
      means formed on the sunglasses unit for receiving electric power;
   an airflow unit having a fan positioned to discharge air onto the upper face area;
   means for transmitting electric power from the sunglasses unit to the airflow unit for powering the fan;
   means for venting the discharged air from the airflow unit; and
   means for attaching the airflow unit to a user's head.

22. The device of claim 21, further comprising:
   means for transmitting electronic audio signals from the sunglasses unit to the airflow unit;
   means for adjustably attaching the earphones to the airflow unit; and
   means for transmitting electronic audio signals from the airflow unit to the earphones.

23. The device of claim 21, wherein the airflow unit further comprises:
   means for receiving electric power and electronic audio signals directly;
   means for transmitting such electric power to the fan; and
   means for transmitting the electronic audio signals to the earphones.

24. The device of claim 21, further comprising means for positioning and powering two or more fans on the airflow unit.

25. The device of claim 21, further comprising means for receiving and transmitting electric power from batteries and the like and delivering the electric power and the electronic audio signals in a common cord to the sunglasses unit.

26. The device of claim 25, further comprising means for controlling the fan.

27. A headphone device for listening to sound generated by an electronic audio device, comprising:
   a left earphone and a right earphone, each earphone having a speaker assembly, each speaker assembly being sized and adapted for broadcast proximate an ear, each earphone further having a telescoping extension member attached to the speaker assembly, each extension member having a coupler;
   a sunglasses unit, the sunglasses unit having:
      a sunglasses frame, having left and right lenses;
      a sunglasses unit audio receiving jack for receiving electronic audio signals from the electronic audio device and for receiving electric power;
      a left sunglasses unit earphone coupler and a right sunglasses unit earphone coupler, each sunglasses unit earphone coupler being in electronic audio communication with the audio receiving jack, each sunglasses unit earphone coupler being adapted for coupling with one of the left and right earphone extension member couplers, such that each earphone extension member coupler is rotatable about the sunglasses unit earphone coupler, and is in electronic audio communication with such sunglasses unit earphone coupler, and further such that such earphone's speaker assembly is positioned proximate an ear;
      an auxiliary power coupler, the auxiliary power coupler being in electronic power communication and electronic audio communication with the sunglasses unit audio receiving jack;
   an airflow unit mounted on said sunglasses frame for delivering forced air to a user's upper face, the airflow unit having:
      an airflow unit power coupler for coupling the airflow unit to the sunglasses unit auxiliary power coupler, such that the airflow unit power coupler is in electronic power communication and electronic audio communication with the sunglasses audio receiver jack for receiving electric power and electronic audio signals;
      a plurality of electric fans in electronic power communication with the airflow unit power coupler;
      a visor member, the visor member being generally conformable to a user's upper face, the visor being adapted to hold and position the fans such that air is drawn into the visor and blown against a user's upper face, the visor member further having an outer edge;
      a vent for discharging such air from within the visor member, the vent comprising a pad member, the pad member being attached to the visor member outer edge such that the pad member is against a user's upper face, the pad member being compressible and having a plurality of channel-shaped air passageways adjacent a user's upper face, such that forced air from the fan exits the visor member through such passageways;
      an attachment device for affixing the visor member against an upper face of a user, the attachment device comprising a strap attached to the visor member;
      a left earphone coupler and a right earphone coupler, each being in electronic audio communication with the airflow unit power coupler, the left and right earphone couplers being further adapted for coupling with the left and right earphone extension member couplers, respectively, such that each earphone extension member coupler is in electronic audio communication with the airflow unit power coupler, and further such that the left and right speaker assemblies are positioned proximate the left and right ears, respectively;

an audio receiving power jack, for receiving audio signals from the electronic audio device, the audio receiving power jack also being adapted to receive electric power, the audio receiving power jack being in electronic power communication with the electronic fan, and electronic audio communication with the airflow unit left earphone coupler and right earphone coupler;

an electric power source fixture adapted to receive and transmit electric power from batteries and the like, the electric power source fixture being integrated with the electronic audio device, the electric power source fixture further having a fan controller for controlling the fans; and a cord for alternately transmitting electric power from the electric power source fixture to either the airflow unit audio receiving power jack or the sunglasses member audio receiving jack.

28. An air-generating device for discharging air onto the upper face of the user, comprising:
an airflow unit, the airflow unit having:
a power jack for receiving electric power;
an electric fan in electronic power communication with the airflow unit power jack;
a visor member, the visor member being generally conformable to and in contact with a user's upper face, the visor member being adapted to hold and position the fan such that air is drawn into the visor member which distributes and blows air against a user's upper face; and
a vent for discharging such air from within the visor member, said vent comprising a pad member, the pad member being attached to the visor member and adapted to rest against a user's upper face, the pad member having air passageways adapted to be adjacent a user's upper face, such that forced air from the fan exits the visor member; and
an attachment device for affixing the visor member against the upper face of a user.

29. The air-generating device of claim 28, wherein the air-generating device is used in conjunction with an electronic audio device, the air-generating device further comprising a left earphone and a right earphone, each earphone having a speaker assembly, each speaker assembly being sized and adapted for broadcast proximate an ear, each earphone further having an extension member attached to the speaker assembly, each extension member having a coupler, and further wherein:

the power jack is adapted for receiving electronic audio signals; and the, airflow unit further comprises a left earphone coupler and a right earphone coupler, each being in electronic audio communication with the airflow unit power jack, the left and right earphone couplers being further adapted for coupling with the left and right earphone extension member couplers, respectively, such that each earphone extension member coupler is in electronic audio communication with the airflow unit power jack, and further such that the left and right speaker assemblies are positioned proximate left and right ears, respectively.

30. The device of claim 29, further comprising:
an electric power source fixture adapted to receive and transmit electric power from batteries and the like, the electric power source fixture being integrated with the electronic audio device; and
a cord for transmitting electric power and electronic audio signals from the electric power source fixture to the airflow unit power jack.

31. The device of claim 30, further comprising a fan controller, the fan controller being integrated with the electronic audio device.

32. The device of claim 28, wherein the number of fans is two or more, the fans being supported by the visor member, the fans being in electronic power communication.

33. The device of claim 28, wherein the vent further comprises a pad member, the pad member being attached to the visor member such that the pad member is against the user's upper face, the pad member having at least one air passageway adjacent the user's upper face, such that forced air from the fan exits the visor member.

34. The device of claim 28, wherein the visor member further comprises an outer edge, the pad member being attached to such visor member outer edge.

35. The device of claim 28, wherein the pad member is compressible.

36. The device of claim 28, wherein the pad member air passageways are channel-shaped.

37. The device of claim 28, wherein the pad member air passageways are circumferentially placed around the visor member outer edge.

38. The device of claim 28, further comprising:
an electric power source fixture adapted to receive and transmit electric power from batteries, the electric power source fixture being portable; and
a cord for transmitting electric power from the electric power source to the airflow unit power jack.

39. The device of claim 38, further comprising a fan controller, the fan controller being integrated with the electric power source fixture.

40. The device of claim 28, wherein the head attachment device comprises a strap attached to the visor member.

* * * * *